(12) United States Patent
Tahiliani et al.

(10) Patent No.: US 9,501,515 B2
(45) Date of Patent: Nov. 22, 2016

(54) DATA GOVERNANCE MANAGER FOR MASTER DATA MANAGEMENT HUBS

(71) Applicant: Oracle International Corporation, Redwood Shore, CA (US)

(72) Inventors: Manoj Tahiliani, Mountain View, CA (US); Pascal Laik, Palo Alto, CA (US); Gurinder Bahl, Fremont, CA (US); Neturi Anil Babu, Fremont, CA (US); Cynthia Chan, San Jose, CA (US); Gokulakrishnan Vasantha Gopal, Tamil Nadu State (IN); Karan D. Shah, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 626 days.

(21) Appl. No.: 13/905,641

(22) Filed: May 30, 2013

(65) Prior Publication Data

US 2013/0268494 A1 Oct. 10, 2013

Related U.S. Application Data

(63) Continuation of application No. 12/564,688, filed on Sep. 22, 2009, now Pat. No. 8,458,148.

(51) Int. Cl.
*G06F 17/30* (2006.01)
*G06F 7/00* (2006.01)
*G06F 17/00* (2006.01)

(52) U.S. Cl.
CPC ........... *G06F 17/30371* (2013.01); *G06F 7/00* (2013.01); *G06F 17/3056* (2013.01); *G06F 17/30303* (2013.01); *G06F 17/00* (2013.01)

(58) Field of Classification Search
None
See application file for complete search history.

(56) References Cited

U.S. PATENT DOCUMENTS

| | | | | |
|---|---|---|---|---|
| 7,461,077 | B1 * | 12/2008 | Greenwood | G06F 3/0482 |
| 7,945,511 | B2 * | 5/2011 | O'Brien | G06Q 20/02 |
| | | | | 705/39 |
| 2006/0238919 | A1 * | 10/2006 | Bradley | G06F 17/30303 |
| | | | | 360/128 |
| 2008/0086387 | A1 * | 4/2008 | O'Rourke | G06F 17/30867 |
| | | | | 705/26.1 |
| 2008/0147610 | A1 * | 6/2008 | Mohanty | G06Q 10/0637 |
| 2009/0094278 | A1 * | 4/2009 | Andrews | G06F 17/30566 |
| 2009/0240694 | A1 * | 9/2009 | Jensen | G06F 17/30 |
| 2010/0088286 | A1 * | 4/2010 | Bansode | G06F 17/30923 |
| | | | | 707/667 |
| 2010/0332535 | A1 * | 12/2010 | Weizman | G06F 11/3672 |
| | | | | 707/770 |
| 2011/0066562 | A1 * | 3/2011 | Stapleton | G06F 21/604 |
| | | | | 705/317 |

* cited by examiner

*Primary Examiner* — Jay Morrison
(74) *Attorney, Agent, or Firm* — Sheppard, Mullin, Richter & Hampton LLP

(57) ABSTRACT

Improved data governance solutions to enterprise-level master data storage hubs are provided by implementing data governance functionality with regard to a master data hub. Data governance functionality is provided by providing visibility into the data quality the data of an enterprise.

19 Claims, 10 Drawing Sheets

Batch Import Screen

Hub Operation in [1 Hour |▽]    as of 12:35 PM    on 12/9/08

☐ Completed Records
  Rejected Records

[bar chart with y-axis 0 to 36, bars for #7257, #7258, #7259]
610

Batch Reports

[New Import] [Schedule Batch]
[Restart Batch] [Search Batch]

| Batch # | System | Start at | Records | Object | Status | Frequency |
|---|---|---|---|---|---|---|
| 7257 | SAP | 12:30 am | 64450 | Account | Pending | Daily |
| 7258 | EBS | 12:50 pm | 46440 | Contact | In Progress | Weekly |
| 7259 | CRM | 1:30 am | 65230 | Household | Completed | Daily |

FIG. 6A

DATA GOVERNANCE MANAGER FOR MASTER DATA MANAGEMENT HUBS

CROSS-REFERENCES TO RELATED APPLICATIONS

This application is a continuation of U.S. patent application Ser. No. 12/564,688, entitled "Data Governance Manager for Master Data Management Hubs," filed Sep. 22, 2009, and naming M. Tahiliani, P. Laik, G. Bahl, N. A. Babu, C. Chan, G. V. Gopal, and K. D. Shah as inventors. This application is assigned to Oracle International Corporation, the assignee of the present invention, and is hereby incorporated by reference, for all purposes as if completely and fully set forth herein.

FIELD OF THE INVENTION

Embodiments of the present invention relate generally to the field of data management and, specifically, to providing improved data governance solutions to enterprise-level master data storage hubs.

BACKGROUND OF THE INVENTION

An enterprise's day-to-day transactions can be described by three different types of data: operational data, analytical data, and master data. Operational data describes an enterprise's operations and is typically provided and used by operational, or transactional, systems. By contrast, analytical data describes an enterprise's decision making and is typically provided by and used by analytical systems. Master data describes a consolidation of operational data and analytical data to produce a single, reliable version of data representative of the enterprise.

One important objective for enterprises is to maintain an accurate and up-to-date version of master data in a master hub, given that the master data supports the operational and analytical sides of an enterprise. In order to create and maintain master data within a master hub, it is desirable to consolidate and cleanse data records received from the various operational and analytical systems. However, master data quality issues may arise due to incomplete and/or erroneous information within data records received from the various operational and analytical systems. These data quality issues can multiply as the number of operational and analytical systems in an enterprise are increased.

One way to address data quality issues is by using data governance tools to ensure proper handling of data records. Data governance tools are used to monitor data quality at each operational and analytical system and at a master data hub. An enterprise can make use of data governance tools at each system and hub, but this can lead to compartmentalization. Such use of separate tools at each system and hub fails to provide a streamline process by which data is governed (i.e., received, handled, processed, evaluated, corrected, and made viewable) throughout all systems and hubs of an enterprise.

It is therefore desirable to provide a single, complete data governance solution for an enterprise. It is further desirable that the data governance solution allow consistent data governance functionality across all systems and hubs of an enterprise, thereby allowing viewing data flows, and identifying and correcting data quality issues across all systems and hubs.

SUMMARY OF THE INVENTION

Embodiments of the present invention provide a data governance manager solution that addresses data governance functionality across operational systems, analytical systems, and master data hubs of an enterprise. Embodiments of the present invention allow a user to access and view operational, analytical, and master data. Embodiments of the present invention also allow a user to view data quality measuring processes that have been executed on the operational and analytical data. These data quality measuring processes are performed both in a staging area as well as on master data and provide a mechanism by which operational and analytical data is checked for compliance with pre-defined rules and standards of data quality.

Embodiments of the present invention provide for receiving one or more data records at a master data management (MDM) module and including the one or more data records in a set of master data, where the one or more data records are received from one or more data sources. In certain embodiments, the set of master data is stored in an MDM hub of the MDM module. Further in this regard, the inclusion of the one or more data records in the set of master data can include storing the one or more data records in the MDM hub and performing one or more data quality functions. In this regard, the storing can be performed by an MDM application of the MDM module, and the one or more data quality functions performed by a data governance manager of the MDM module One embodiment of the present invention provides a data governance manager that receives a plurality of data records from one or more data sources, determines if a selected data record can be included in a set of master data, includes the selected data record in the set of master data if the selected data record can be included in the set of master data, corrects the selected data record if the selected data record cannot be included in the set of master data, and includes the modified data record in the set of master data.

BRIEF DESCRIPTION OF THE DRAWINGS

The present invention may be better understood, and its numerous objects, features and advantages made apparent to those skilled in the art by referencing the accompanying drawings.

FIG. 6A illustrates an example of a user interface for displaying processes that have been executed on data records, provided by embodiments of the present invention.

DETAILED DESCRIPTION

As described, data quality issues may arise when attempting to consolidate operational and analytical data into a set of master data. It is therefore desirable to use data governance solutions within an enterprise. Data governance solutions provide the framework, strategy, objectives, and priorities that are needed to ensure master data is available, usable, consistent, and reliable.

As the number of enterprise systems and hubs increases, the need for a single data governance solution becomes more prominent. This is because enterprises are constantly striving to incorporate improved decision-making processes, adopt common approaches to resolve data quality issues, build standard processes for handling data, reduce overall cost, increase efficiency, ensure data transparency, and standardize definitions for all types of incoming data. Thus, a need exists for a single data governance solution that implements the above goals by unifying data governance functionality across the systems and hubs of an enterprise.

A data governance manager solution is provided for data governance functionality across the systems and hubs of an enterprise. This solution allows for defining common data quality rules and standards to be applied throughout an enterprise, viewing data records across all systems and hubs, monitoring data and associated data quality issues, and identifying and correcting errors within data records.

Embodiments of the present invention provide access to and views of operational data, analytical data, and master data. Embodiments of the present invention also allow a user to view data quality measuring processes that have been executed on the operational and analytical data. These data quality measuring processes are performed both in a staging area as well as on master data and provide a mechanism by which operational and analytical data is checked for compliance with pre-defined rules and standards of data quality. Examples of such pre-defined rules and standards include rules for checking data record content for data completeness, accuracy, and conformity to pre-defined formats.

In addition, embodiments of the present invention also provide such functionality by allowing a user to correct fragmented, inconsistent, and erroneous information within operational and analytical data. The correction process allows a user to manipulate and correct data entries within operational and analytical data records to satisfy the pre-defined rules and standards of data quality. Such corrected records are then processed within a staging area to check for compliance with pre-defined rules and standards of data quality. The corrected records are then added to the master data set by transferring the corrected data records to a master data hub.

Figure 1:
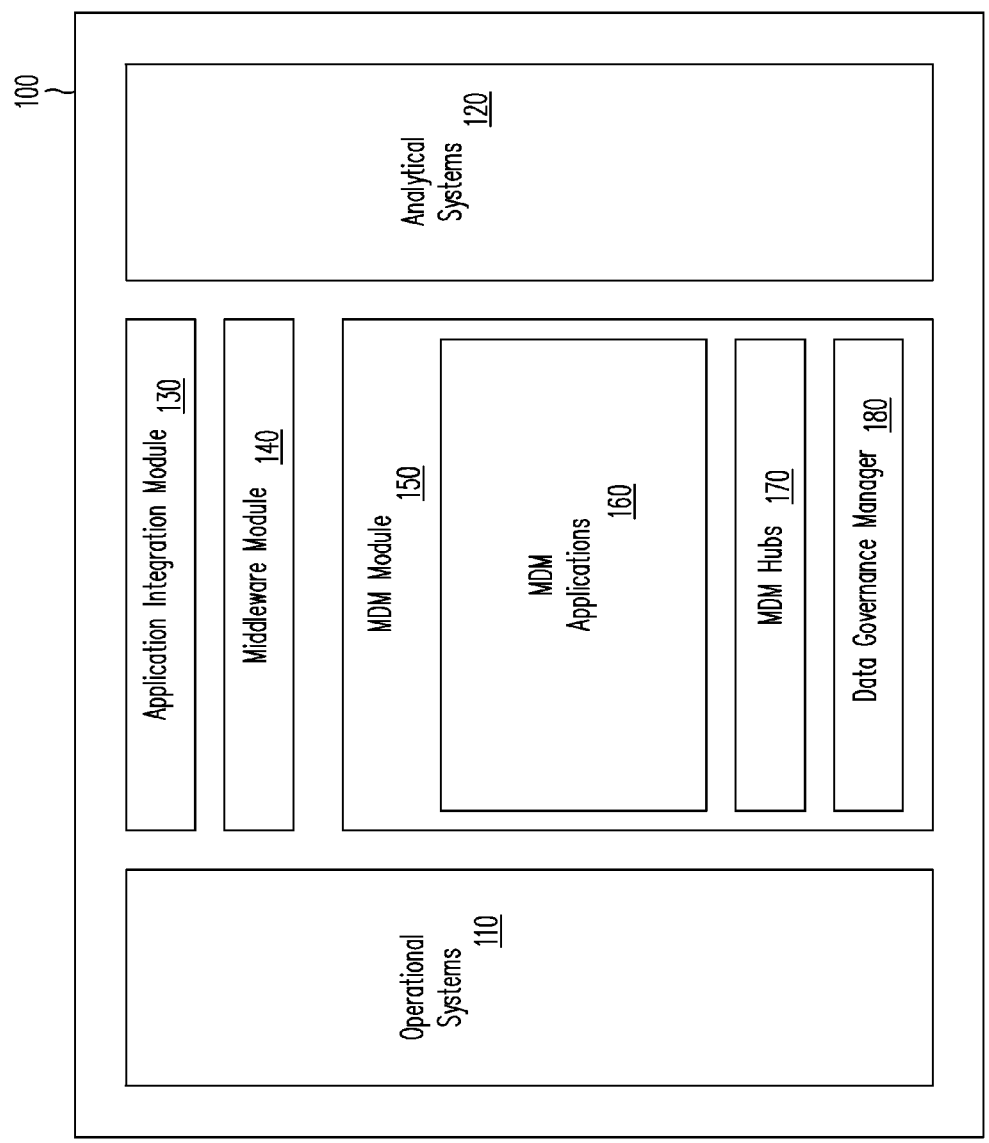
FIG. 1 is a simplified block diagram illustrating an enterprise data architecture usable in conjunction with embodiments of the present invention.

FIG. 1 illustrates a simplified block diagram illustrating an enterprise data architecture usable in conjunction with embodiments of the present invention. The enterprise data architecture 100 includes operational systems 110, analytical systems 120, application integration module 130, middleware module 140, and MDM module 150.

Operational systems 110 include applications for generating and using operational data. Operational data describes the operational state of an enterprise. The operational state of an enterprise may include areas such as sales, service, order management, manufacturing, purchasing, billing, accounts receivable and accounts payable. Operational systems can include point of sale data systems, customer response management systems, and the like.

Analytical systems 120 include applications that generate and use analytical data to support decision-making for an enterprise. For example, analytical data can be used to identify profitability, customer segmentation, supply chain needs, and product failure patterns. Analytical systems can include data marts, extraction, transformation and loading tools, business intelligence tools, and the like.

Application integration module 130 and middleware module 140 include architecture and technologies used to support master data management (MDM) integration with operational and analytical systems. MDM describes a set of processes and tools for defining and managing master data for an enterprise, including data governance processes. The combination of application integration module 130 and middleware module 140 provide interfaces for integrating operational systems 110, analytical systems 120, and MDM module 150. In addition, these two modules provide the necessary tools by which operational and analytical data is received and consolidated for further processing by MDM module 150.

MDM module 150 provides, for example, functionality for storing master data, consolidating master data into a central hub, cleansing data to remove duplicates, standardizing data, and increasing the amount of master data. Embodiments of MDM module 150 can include operation-specific modules, such as MDM applications 160, MDM hubs 170, and data governance manager (DGM) 180. MDM applications 160 provide, for example, data profiling, matching, cleansing, and standardizing operations used to consolidate operational data and analytical data into master data. An MDM hub 170 provides storage for master data records. Data governance manager 180 provides data governance functionality.

As discussed, MDM hub 170 is a central repository for master data. An enterprise can store master data in a plurality of MDM hubs, with each hub tasked to store a defined subset of the enterprise's master data. For example, hubs can provide storage of customer master data or product master data. The master data in hub is typically recognized as the trusted source for data across the enterprise. Communication between a DGM and an MDM hub can be accomplished through a variety of network protocols, including for example, web services such as XML, SOAP, WSDL, and UDDI open standards over an Internet protocol backbone.

Data governance manager 180 provides complete data governance functionality for an enterprise. In particular, data governance manager 180 can provide the following functionality: visibility into data records across systems and hubs, visibility into data quality measuring processes executed on data records, monitoring capabilities, data correction capabilities for correcting erroneous data entries within data records, data quality reporting capabilities, and the like.

The visibility capabilities offered by DGM, which permit viewing data records and data quality measuring processes executed on data records, can be useful for a DGM user performing data stewardship operations. Data stewardship operations provide a mechanism by which master data is monitored and maintained in order to achieve and maintain desired levels of data quality for master data records. For example, a DGM user may wish to view the data quality measuring processes that have been executed on a set of data records to better understand the process flow by which master data is created. Process information requests may yield, for example, a number of data records and a listing of the data records that have been successfully consolidated, have not been successfully consolidated, or are currently pending.

Further, data governance manager 180 also provides reporting capabilities for each system or hub of an enterprise. One aspect of an embodiment of the present invention uses the reporting capability to present a summary of data records within a particular system or hub. A DGM user may choose to view the overall level of data quality for data records within a system or hub. Once a system or hub is specified, DGM is able to access the data records corresponding to the specified system or hub, retrieve data quality measuring process information from a DGM staging area, and create a summary presentation of this data as it pertains to the selected system or hub. This summary information may be useful in the identification of errors.

Another aspect of an embodiment of the present invention uses the reporting capability to measure data quality within a system or hub according to a set of pre-defined matrices. These pre-defined matrices identify data quality requirements of data record entries. Some examples of pre-defined matrices include data accuracy, conformity, completeness, consistency, duplicates, and integrity.

DGM also provides for error correction of data records within a system or hub. A DGM user can refer to information obtained from data quality measuring processes executed on data records stored in a system or hub, in order to identify sources of error within data records. This information may identify the data quality measuring processes executed on the data records, the system on which these processes were executed, and the error that occurred during the processing. The rejected data record may then be retrieved from a staging area for correction of the error. Once corrected, DGM will re-execute the same data quality measuring processes on the corrected data record to check for compliance with data quality rules and standards.

Yet another aspect of DGM provides for monitoring and tracking capabilities. These capabilities provide insight into data flows by providing a history of data record activities and changes. For example, retrieved data records from a staging area or a hub can be appended with information that describes details such as a number of inserts and updates made to each data record.

Figure 2:
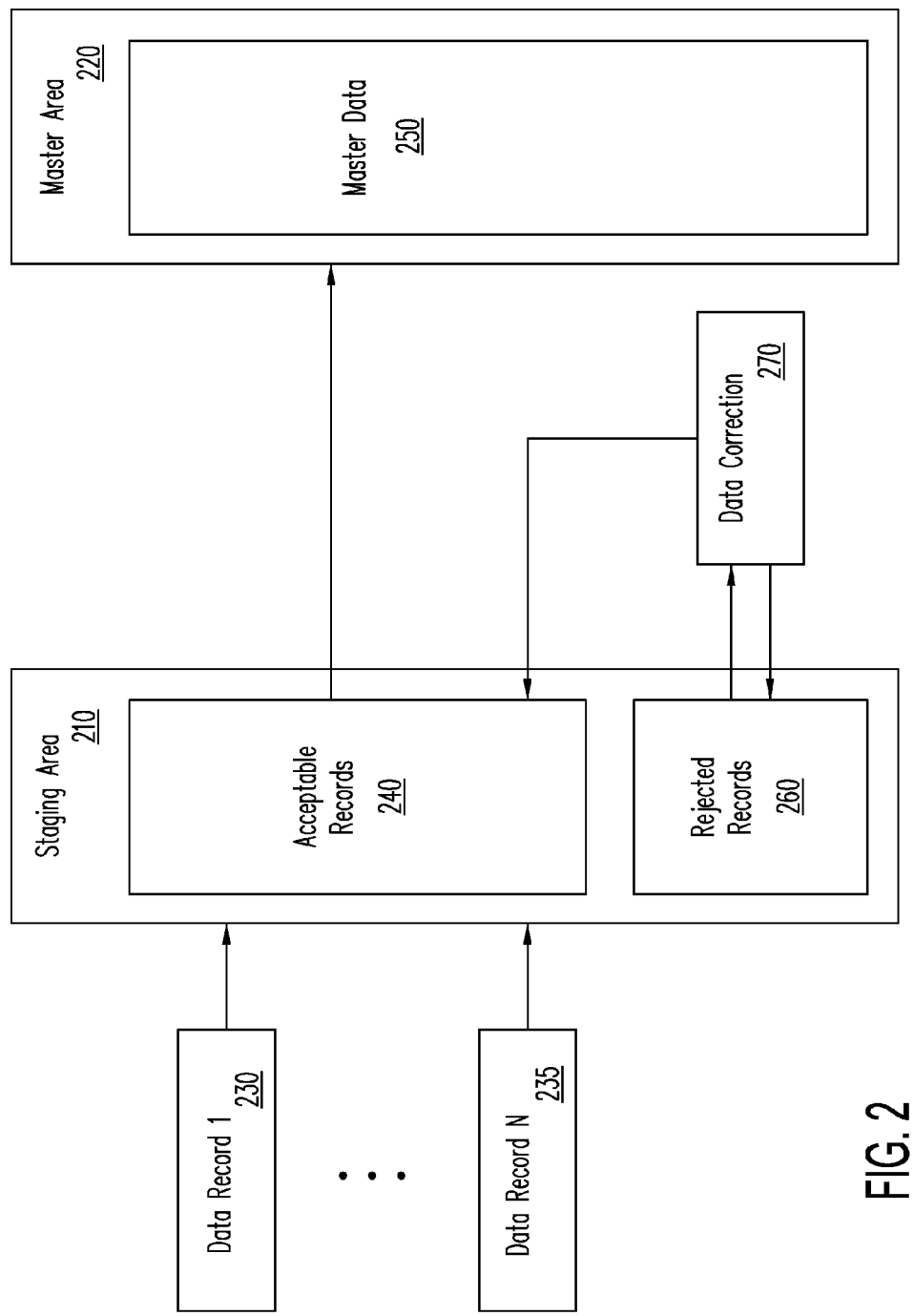
FIG. 2 is a simplified block diagram illustrating a system for receiving and processing data records by a data governance manager, in accord with embodiments of the present invention.

FIG. 2 is a simplified block diagram illustrating a system for receiving and processing data records by a DGM, in accord with embodiments of the present invention. Data record processing is divided into two principle processing areas: staging area 210 and master area 220.

Data records 230 and 235 represent incoming data records received from one or more external data sources. These external data sources can include operational systems 110 or any legacy systems maintained by an enterprise. Data records 230 and 235 can include information such as customer data changes, production identification, pricing information, and the like. Data records 230 and 235 are consolidated and transferred to staging area 210 for initial processing.

Staging area 210 provides for individually assessing each received data record according to data quality rules and standards. These data quality rules and standards are based on pre-defined data quality goals and may include factors such as requirements for data completeness, data accuracy, acceptable range of values, and the like. The data quality rules and standards can be pre-defined within DGM or can be customized for an enterprise. In addition, use of data quality rules and standards can help a user identify bad data sources within an enterprise.

The data quality rules and standards can be stored in a memory accessible by staging area processors and are retrieved by such processors as needed in order to assess received data records. If a data record conforms to appropriate data quality rules and standards, the data record can be stored as an acceptable record 240 within staging area 210. Acceptable records can be transferred to the master area 220 for storage in master data 250.

A data record that does not conform to appropriate data quality rules and standards can be stored as a rejected record 260. At this point, a user may access rejected records 260 to perform correction operations. Selected rejected records are then transferred to data correction 270 where such correction techniques may be implemented, as discussed in detail below. Corrected data records can be stored as acceptable records 240 in staging area 210, where such corrected data records are re-tested for conformance with data quality rules and standards. Those corrected data records that do conform to data quality rules and standards are transferred to master area 220 for storage in master data 250. If corrected data records do not conform to data quality rules and standards, the data records are stored as rejected records 260.

Figure 3:
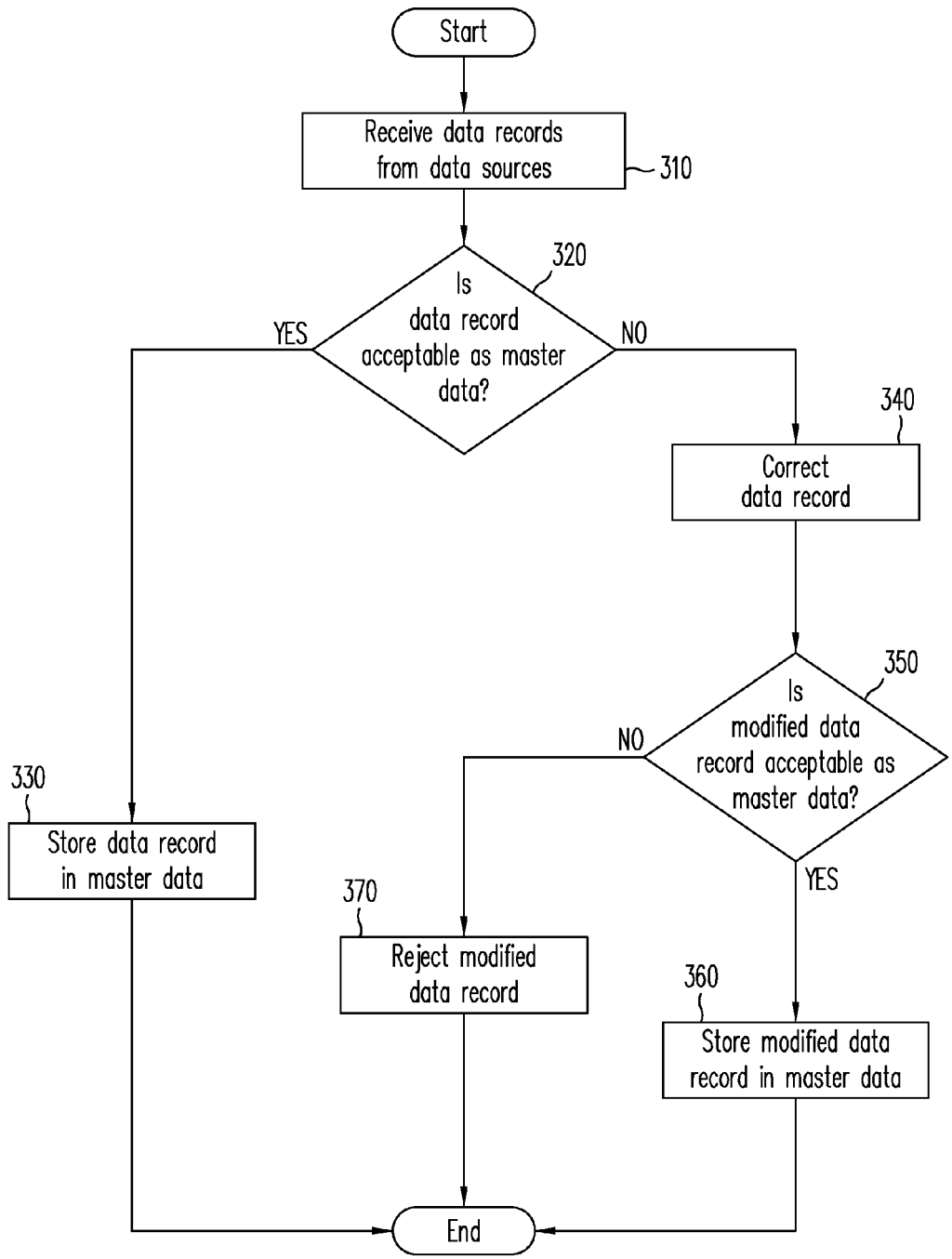
FIG. 3 illustrates a simplified flow diagram illustrating steps performed for processing data records, in accord with embodiments of the present invention.

FIG. 3 is a simplified flow diagram illustrating steps performed for processing data records, in accord with embodiments of the present invention. A number of data records are received from a plurality of data sources (e.g., at staging area 210) (310). Such data sources may include, for example, a number of different operational systems and legacy systems maintained by an enterprise.

Each data is individually assessed to determine whether the data record is acceptable and can be included in a set of master data (320). This determination depends on whether information in the data complies with one or more sets of pre-determined data quality rules and standards.

If is determined that the data record is acceptable and can be included in the set of master data, the data record is stored in the set of master data (330). If the data record cannot be included in the set of master data, then the data record is made available for possible correction (340). Once corrected, a new determination is made to see if the modified data record is acceptable and can be included in the set of master data (350). If the modified data record is acceptable and can be included in the set of master data, the data record is stored as an acceptable data record in a staging area (e.g., 210) and subsequently stored in the set of master data (360). If the modified data record is not acceptable and cannot be included in the set of master data, the data record is rejected (370). Temporary storage of data records that are rejected, acceptable, and corrected can be provided within a staging area. Any storage of master data can be provided by an MDM hub.

Figure 4:
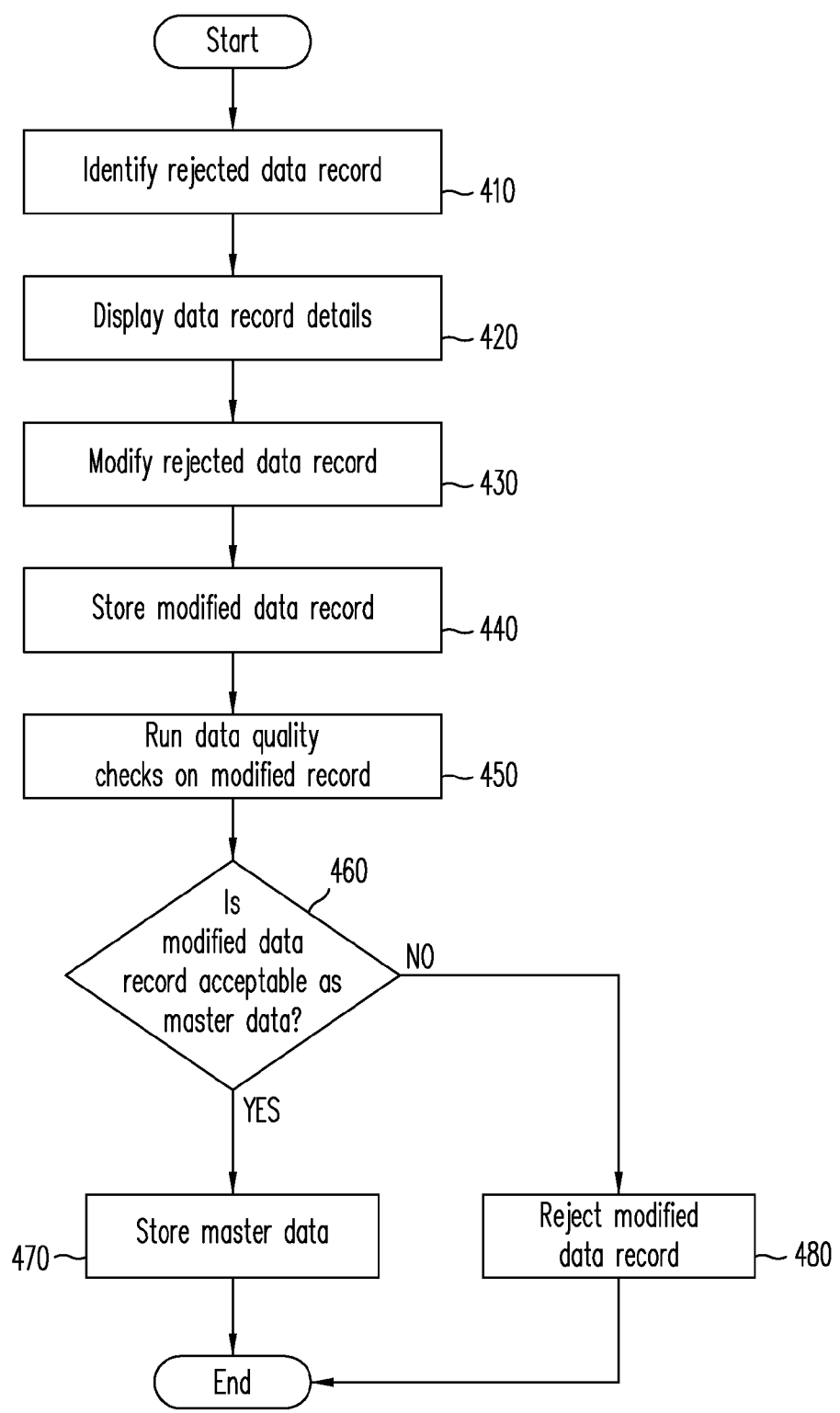
FIG. 4 illustrates a simplified flow diagram illustrating the steps performed to correct a rejected data record, in accord with embodiments of the present invention.

FIG. 4 is a simplified flow diagram illustrating correction of a rejected data record (e.g., correcting a data record (340)), in accord with embodiments of the present invention. The process begins with identification of a rejected data record (410). This identification process is performed by processors within a staging area (e.g., 210) as data records are tested for conformance with data quality rules and standards. A rejected data record is a data record that fails to comply with one or more sets of data quality rules and standards for inclusion into a set of master data. Rejected data records are stored in a rejected records area (e.g., 260) of the staging area.

A rejected data record may then be retrieved and displayed (420). The display of the rejected data record can include detailed information such as the type of data quality measuring process executed on the rejected data record, the system on which the process was executed, an identification of the process, a current status of the process, and an error code that identifies the source of the error within data record entries. Using this information, a rejected data record can be modified to fix the source of the error and thus comply with the data quality rules and standards that caused the record to be rejected (430). For example, a data record entry rejected for having an incorrect customer address format can be retrieved and corrected to include an acceptable customer address format.

Once a rejected data record has been modified, the modified data record is then stored (440). Such storage can occur within the staging area. The modified data records can then be re-checked for compliance with the one or more sets of data quality rules and standards (460). If the modified data record is found to conform to data quality rules and standards, the modified data record is stored in the set of master data (470). Otherwise, if the modified data record fails to meet data quality rules and standards, the modified data record is once again rejected (480) and stored within the rejected records area for further processing.

Figure 5:
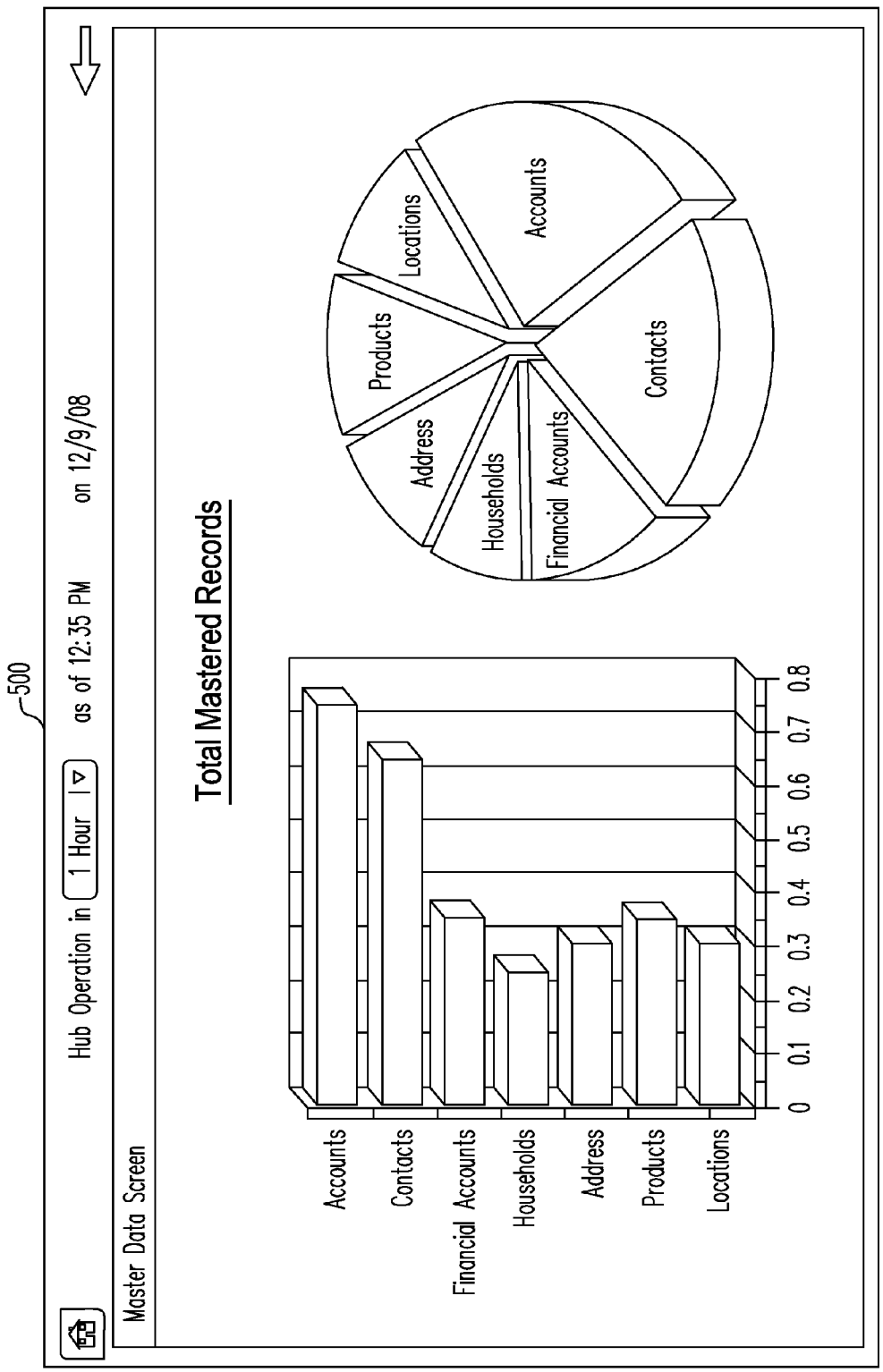
FIG. 5 illustrates an example of a user interface for displaying summary information of data records, provided by embodiments of the present invention.

FIG. 5 illustrates an example of a user interface for displaying summary information of data records, provided by embodiments of the present invention. Such a display can be provided for data within each operational system, analytical system, or master hub.

Display 500, in particular, provides an exemplary user interface for displaying a summary of master data records within a master data hub during a selected time period. The master data records include data records that have been tested and shown to conform to data quality rules and standards during the selected time period. Master data is summarized and broken down into a number of categorical segments, such as accounts, contacts, financial accounts, households, address, products, and locations. These categories are examples of how data records are classified by a source, using a metadata definition. The categorical segments can be displayed in a variety of forms (e.g., a bar graph, a pie chart) and the selectable time period can be selected by the user.

Additional details about master data records can be viewed using display 500 as a selection point. For example, selecting one of the categorical segments of the master data (e.g., by clicking on a segment of the pie chart) provides additional details regarding the data records making up such a category. These additional details may be generated as part of a new user interface. Additional details may include data record entries within the master data records corresponding to the selected categorical segment and a listing of changes made to these records. The new user interface can also be used to see data lineage of master data records.

Figure 6B:
FIG. 6B illustrates an example of a user interface for displaying data record details for a set of data records on which a process was executed, provided by embodiments of the present invention.

FIGS. 6A and 6B illustrate examples of a user interface for displaying information regarding data quality checking processes executed on data records, in accord with embodiments of the present invention. Display 600 shows an exemplary snapshot displaying a report listing data quality measuring processes that have been executed on data records during a given time period. Such information is retrieved from the staging area storage and displayed accordingly. Display 600 can include statistical results for data quality measuring processes executed on data records. These statistical results can include, for example, a process identifier, a system identifier for the system on which the process was executed, the categorical segment to which the data records belongs, a status of the process, and a frequency at which the process is executed for data records. Time periods used for this type of display are selected by a user and may include, for example, time periods for the last hour, day, week, month or year.

As illustrated in FIG. 6A, a bar graph 610 displays a number of completed and rejected data records corresponding to a selected data quality measuring process that was executed during a selected time period. This information is extracted from the staging area storage which tracks identifying information for data records as data records are received and processed by the staging area.

FIG. 6B illustrates a user interface for displaying details for a set of data records on which a process was executed. A user begins by selecting a process identified as having rejected data records provided by display 600 in FIG. 6A (e.g., by selecting a rejected records portion corresponding to a process in bar graph 610). Once selected, display 620 provides a listing of the rejected data records identified by the selected process. At this point, a user can identify and correct rejected data records.

In order to correct a rejected data record, a user may select to correct errors within fields of a rejected data record. Erroneous information within fields of the rejected data records can be identified from the list of display 620. For example, display 620 provides a listing of particular error codes and error descriptions for each rejected record within a selected process. This error identification process allows a user to determine and correct the source of erroneous information within a rejected data record. A user can correct such erroneous information by selecting a rejected data record and modifying the data field information manually. Thereafter, the rejected data record with the corrected information is saved as a modified data record in a staging area. As an example, display 620 illustrates data records having erroneous phone number entries that have a non-standard set of digits in the phone number.

Once an error is identified and corrected, the modified data record is re-tested for compliance with data quality rules and standards. If the modified data record is found to comply with data quality rules and standards, the modified data record is included in the set of master data. Otherwise, the modified data record is deemed a rejected data record. This process can be performed for correcting all rejected data records.

Figure 7:
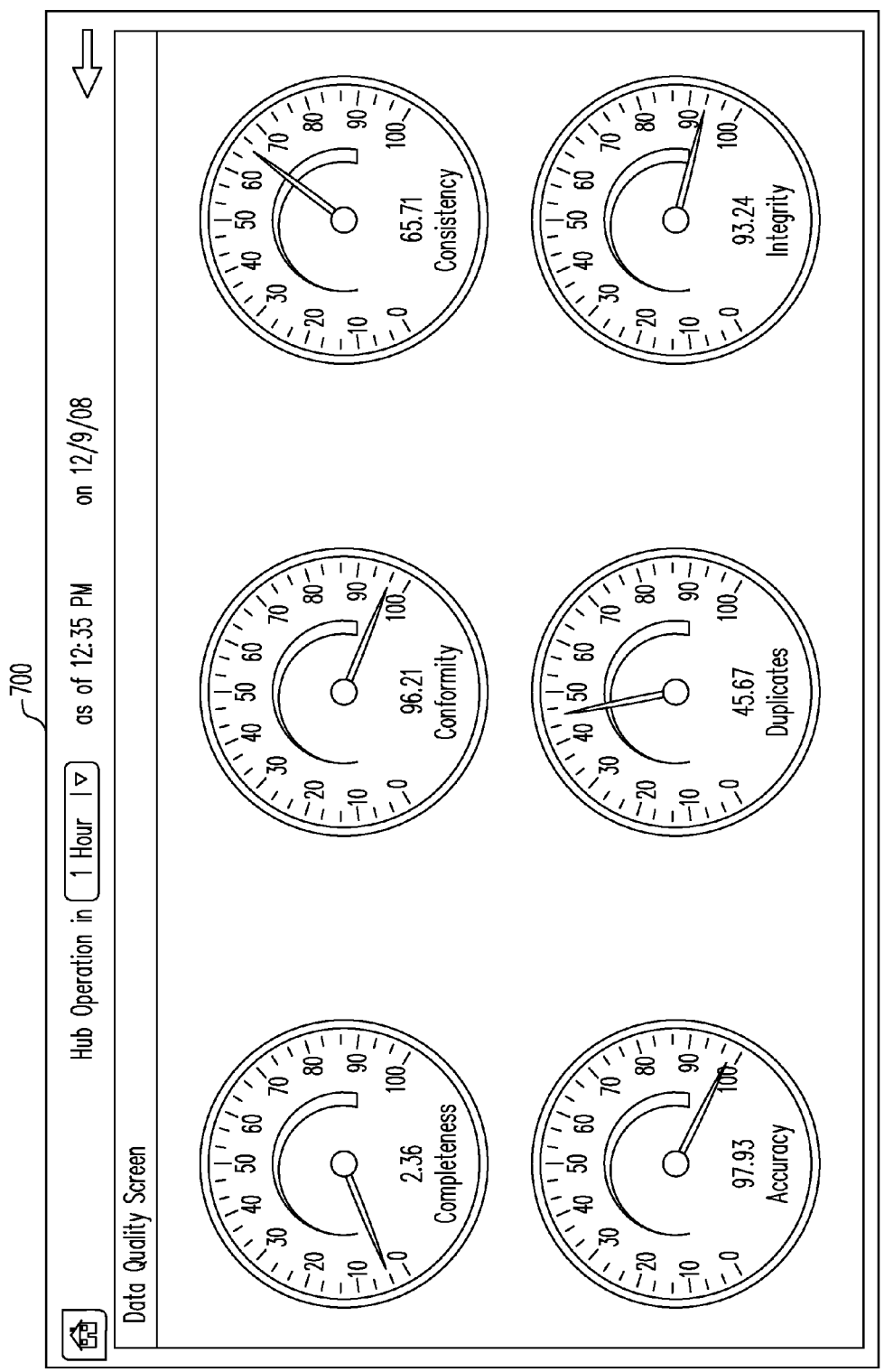
FIG. 7 illustrates an example of a user interface for displaying a summary of data quality information for a given set of data records, provided by embodiments of the present invention.

FIG. 7 illustrates an example of a user interface for displaying a summary of data quality information for data records at a system or hub, in accord with the embodiments of the present invention. This type of summary information is useful for understanding the overall level of data quality for a system or a hub. The level of data quality is measured according to a pre-defined set of standards that is either pre-defined by DGM or customized by an enterprise.

An example of the standards by which data quality can be measured can include data completeness, conformity, consistency, accuracy, duplicates, and integrity, each of which provides different data quality information. Completeness information may indicate whether required data records and required data values are available. Conformity information may indicate whether all types, precision, formats, keys, codes, and domain ranges of data records are in a required format. Consistency information may indicate whether conflicting information exists between data records. Accuracy information may indicate whether data records have originated from a known source. Duplication information may indicate whether a single data record exists to represent an entity. And, integrity information may indicate whether data record information is properly identified and referenced.

The information needed to generate such a user interface may be retrieved from a staging area storage or the master area and used to compile the summary of display 700. A user can also select a data quality standard from display 700 to obtain trend reports for data records or view the actual records contributing to the displayed trend reports by selecting a trend report and viewing additional details.

An Example Computing and Network Environment

As shown above, the present invention can be implemented using a variety of computer systems and networks. An example of one such computing and network environment is described below with reference to FIGS. 8 and 9.

Figure 8:
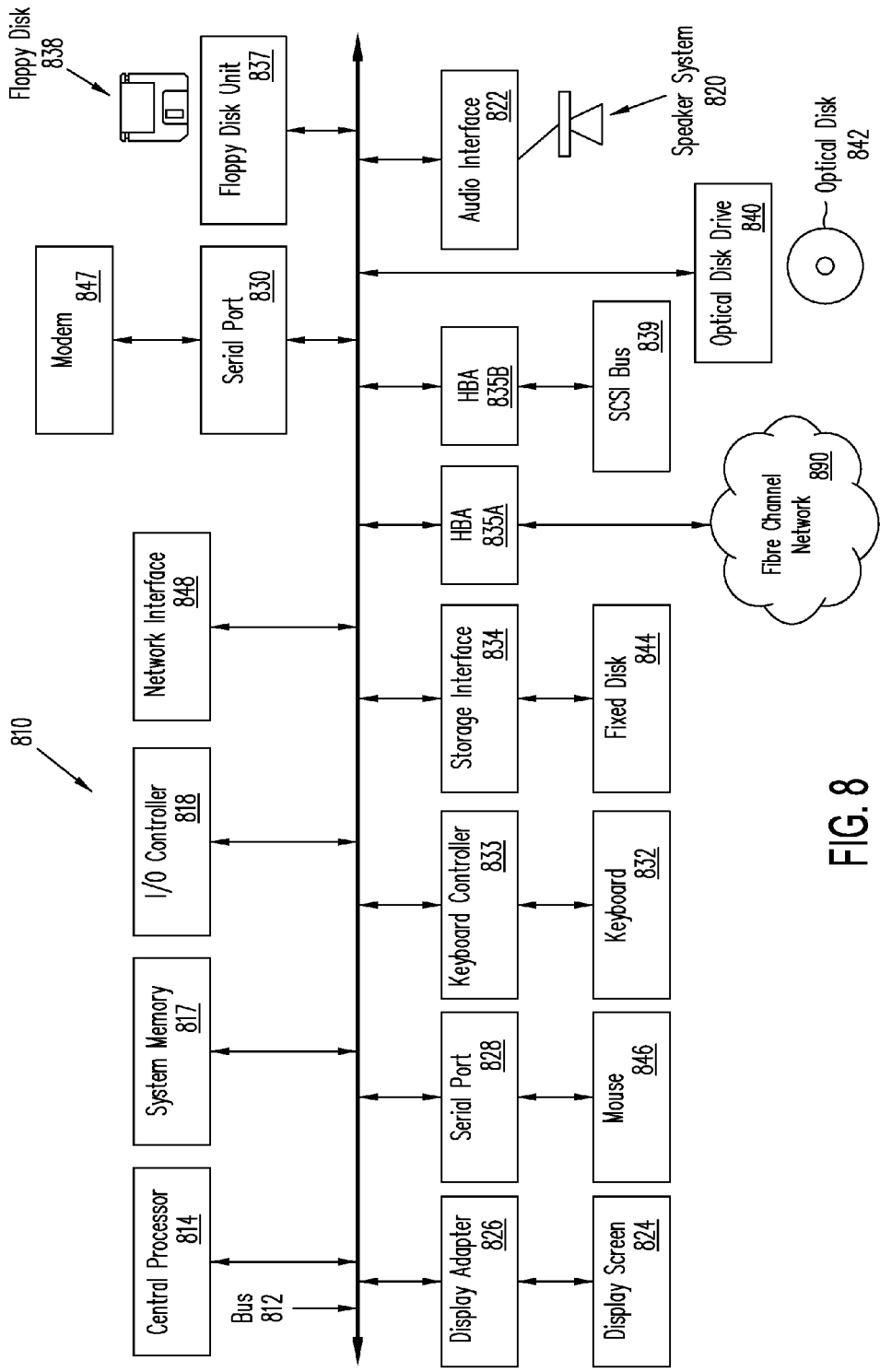
FIG. 8 is a simplified block diagram of a computer system suitable for implementing aspects of the present invention.

FIG. 8 depicts a block diagram of a computer system 810 suitable for implementing aspects of the present invention, including staging area 210 and source systems 230 and 235. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer-readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer-readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present invention. The devices and subsystems can be interconnected in different ways from that shown in FIG. 8. The operation of a computer system such as that shown in FIG. 8 is readily known in the art and is not discussed in detail in this application. Code to implement the present invention can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
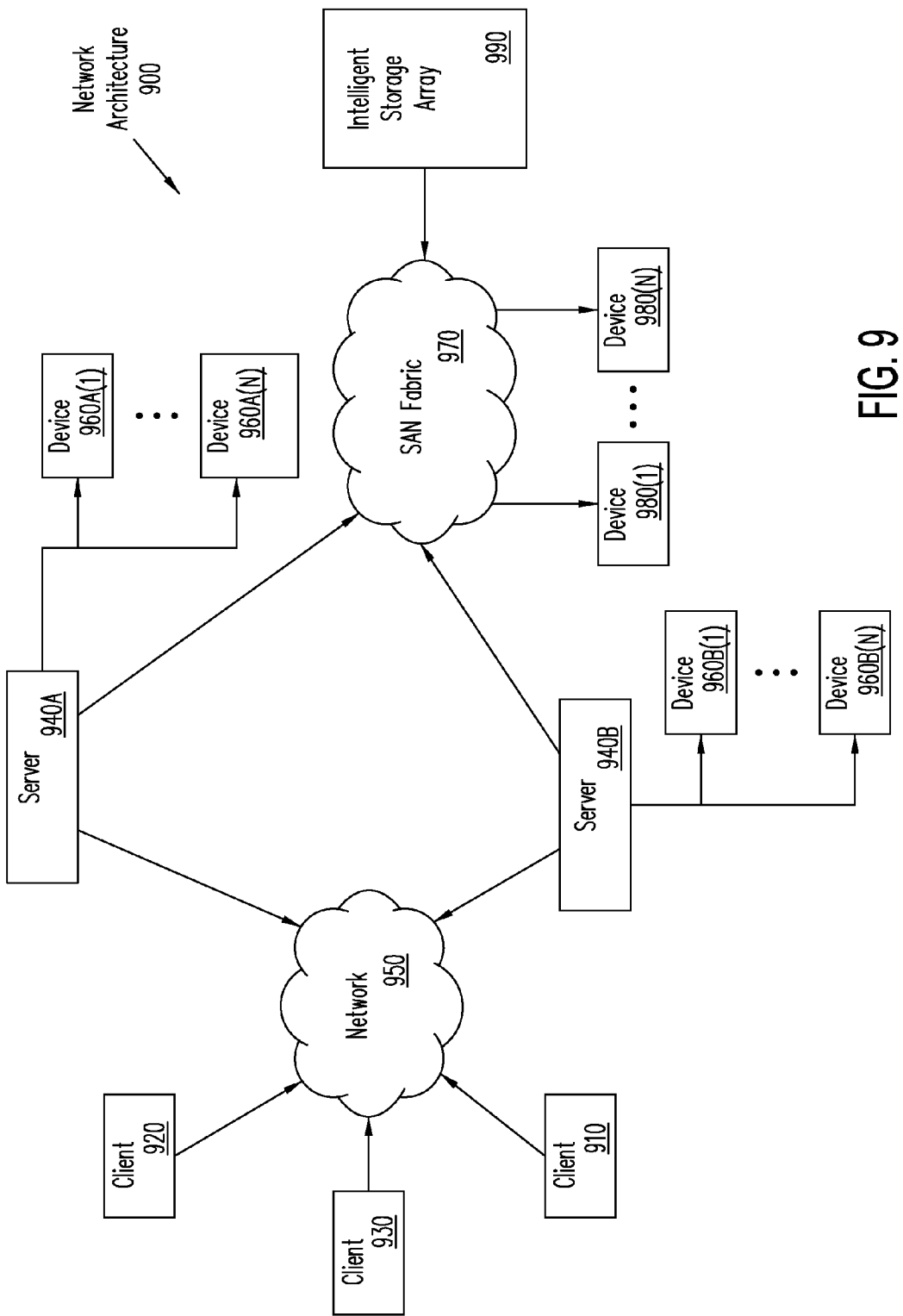
FIG. 9 is a simplified block diagram of a network architecture suitable for implementing embodiments of the present invention.

FIG. 9 is a block diagram depicting a network architecture 900 in which client systems 910, 920 and 930, as well as storage servers 940A and 940B (any of which can be implemented using computer system 810), are coupled to a network 950. Storage server 940A is further depicted as having storage devices 960A(1)-(N) directly attached, and storage server 940B is depicted with storage devices 960B(1)-(N) directly attached. Storage servers 940A and 940B are also connected to a SAN fabric 970, although connection to a storage area network is not required for operation of the invention. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 810). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving one or more data records at a master data management (MDM) module, wherein the one or more data records are received from one or more data sources; and
   including the one or more data records in a set of master data, wherein the set of master data is stored in an MDM hub of the MDM module, the including the one or more data records in the set of master data comprises storing the one or more data records in the MDM hub, wherein
      the storing is performed by an MDM application of the MDM module,
   performing one or more data quality functions, wherein the one or more data quality functions are performed by a data governance manager of the MDM module, and wherein at least one data quality function involves monitoring the data quality of the master data and performing one or more data correction operations for correcting at least one erroneous data record in the master data,
   determining data quality information for the one or more data records, the
      data quality information indicating at least one or more data records that have been successfully consolidated for the set of master data, one or more data records that have not been successfully consolidated for the set of master data, and one or more data records that are pending consolidation for the set of master data; and
   providing, for display, the data quality information for the one or more data records.

2. The method of claim 1, wherein
   the one or more data records comprise at least one of
      operational data from an operational system, or
      analytical data from an analytical system, and
   the MDM module is configured to be coupled to the operational system and the analytical system.

3. The method of claim 2, wherein
   the MDM module is coupled to the operational system and the analytical system via
      an application integration module, and
      a middleware module, the one or more data records are received at the application integration module, and
the data governance manager is coupled to the MDM hub and the middleware module.

4. The method of claim 3, wherein the one or more data quality functions comprises:
managing the data quality of the master data, wherein the managing comprises
processing the one or more data records.

5. The method of claim 1, wherein
the one or more data quality functions comprise at least managing the data quality of the master data.

6. The method of claim 1, wherein
the data governance manager is coupled to the MDM application and the MDM hub.

7. The method of claim 1, further comprising:
displaying data quality information for the one or more data records, wherein the monitoring produces the data quality information.

8. The method of claim 7, wherein the data quality information comprises at least one of
a completeness report, wherein
the completeness report identifies an identified data record of the one or more data records having a missing attribute,
a conformity report, wherein
the conformity report identifies an identified data record of the one or more data records conforming to a usable data format,
an accuracy report, wherein
the accuracy report identifies an identified data record of the one or more data records that has been received from a known data source,
a consistency report, wherein
the consistency report identifies a conflict within the one or more data records, or
a duplication report, wherein
the duplication report identifies duplicate data records within the one or more data records.

9. The method of claim 1, further comprising:
displaying a summary of a set of data records, wherein the master data comprises the set of data records;
selecting at least one data record from the summary of the set of data records; and
displaying data record details for the at least one data record.

10. The method of claim 9, wherein the data record details comprise one or more of:
data fields for the at least one data record,
a listing of the processes executed on the at least one data record, and
a processing status indicator for the at least one data record.

11. The method of claim 10, wherein
the data record details indicate record and attribute changes made to the at least one data record within a selected time period.

12. The method of claim 1, further comprising:
selecting a data source from a plurality of data sources;
displaying a summary of the data records received from the data source;
selecting a set of data records from the summary of the data records; and
displaying data record details corresponding to the set of data records.

13. The method of claim 12, wherein the data record details comprise at least one of
data fields for the set of data records,
a listing of the processes executed on the set of data records, or
a processing status indicator for the set of data records.

14. The method of claim 1, wherein the storing further comprises:
storing the one or more data records as a part of the set of master data.

15. A computer program product comprising:
a plurality of instructions, configured to implement a master data management (MDM) module, comprising
a set of instructions, executable on a computer system, configured to receive one or more data records, wherein
the one or more data records are received at the MDM module from one or more data sources, and
a set of instructions, executable on the computer system, configured to include the one or more data records in a set of master data, wherein the set of master data is stored in an MDM hub of the MDM module, and the second set of instructions comprises
a subset of instructions, executable on the computer system, configured to store the one or more data records in the MDM hub, wherein
the subset of instructions are comprised in an MDM application of the MDM module, and
a subset of instructions, executable on the computer system, configured to perform one or more data quality functions, wherein
the subset of instructions comprised in a data governance manager of the MDM module, wherein at least one data quality function involves monitoring the data quality of the master data an performing one or more data correction operations for correcting at least one erroneous data record in the master data;
a subset of instructions, executable on the computer system, configured to determine data quality information for the one or more data records, the data quality information indicating at least one or more data records that have been successfully consolidated for the set of master data, one or more data records that have not been successfully consolidated for the set of master data, and one or more data records that are pending consolidation for the set of master data;
a set of instructions, executable on the computer system, configured to provide, for display, the data quality information for the one or more data records; and
a computer-readable storage medium, wherein the instructions are encoded in the computer-readable storage medium.

16. The computer program product of claim 15, wherein
the one or more data records comprise at least one of
operational data from an operational system, or
analytical data from an analytical system, and
the MDM module is configured to be coupled to the operational system and the analytical system.

17. The computer program product of claim 15, wherein
the one or more data quality functions comprise at least managing the data quality of the master data.

18. The computer program product of claim 17, wherein the instructions further comprise:
a third set of instructions, executable on the computer system, configured to select a data source from a plurality of data sources;

a fourth set of instructions, executable on the computer system, configured to display a summary of the data records received from the data source;
a fifth set of instructions, executable on the computer system, configured to select a set of data records from the summary of the data records; and
a sixth set of instructions, executable on the computer system, configured to display data record details corresponding to the set of data records.

19. A computer system comprising:
a processor;
a computer-readable storage medium coupled to the processor; and
a master data management (MDM) module, wherein
   the MDM module comprises
      an MDM application,
      an MDM hub, and
      a data governance manager, coupled to the MDM application and the MDM hub,
   the MDM hub is configured to store master data,
   the MDM module is configured to
      receive, at the MDM application, one or more data records from at least one of an operational system or an analytical system, and
      store the one or more data records at the MDM hub as a part of the master data, and
   the data governance manager comprises a plurality of instructions, encoded in the computer-readable storage medium and configured to cause the processor to
      perform a data quality function, wherein
         the data quality function comprising at least one of
            monitoring data quality of the master data,
            managing data quality of the master data, and
            perform one or more data correction operations for correcting at least one erroneous data record in the master data,
      determine data quality information for the one or more data records, the data quality information indicating at least one or more data records that have been successfully consolidated for the set of master data, one or more data records that have not been successfully consolidated for the set of master data, and one or more data records that are pending consolidation for the set of master data,
      provide, for display, the data quality information for the one or more data records.

\* \* \* \* \*

UNITED STATES PATENT AND TRADEMARK OFFICE
CERTIFICATE OF CORRECTION

PATENT NO. : 9,501,515 B2  
APPLICATION NO. : 13/905641  
DATED : November 22, 2016  
INVENTOR(S) : Tahiliani et al.

Page 1 of 1

It is certified that error appears in the above-identified patent and that said Letters Patent is hereby corrected as shown below:

In the Specification

In Column 2, Line 26, after "module" insert -- . --.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*